United States Patent [19]

Sakata et al.

[11] 4,288,677
[45] Sep. 8, 1981

[54] WELDING METHOD OF TURBINE DIAPHRAGM

[75] Inventors: Shinji Sakata; Hirakazu Yokota; Tasuku Shimizu, all of Hitachi; Yasuhiko Otawara, Katsuta, all of Japan

[73] Assignee: Hitachi, Ltd., Tokyo, Japan

[21] Appl. No.: 80,458

[22] Filed: Oct. 1, 1979

[30] Foreign Application Priority Data

Sep. 29, 1978 [JP] Japan .................. 53/119391

[51] Int. Cl.³ ............................... B23K 15/00
[52] U.S. Cl. ....................................... 219/121 ED
[58] Field of Search .............. 219/121 ED, 121 EC, 219/121 LC, 121 LD, 118, 69 R, 137 R

[56] References Cited

U.S. PATENT DOCUMENTS

| | | | |
|---|---|---|---|
| 3,560,700 | 2/1971 | Reidelsturz et al. | 219/121 ED |
| 3,582,605 | 6/1971 | Lamatsch | 219/121 ED |
| 3,617,685 | 11/1971 | Brill-Edwards | 219/121 ED |
| 3,975,612 | 8/1976 | Nakazakig et al. | 219/121 ED |
| 3,999,030 | 12/1976 | Nakazakig et al. | 219/121 ED |
| 3,999,031 | 12/1976 | Yonezawa et al. | 219/121 ED |

FOREIGN PATENT DOCUMENTS

53-30436  3/1978  Japan .

Primary Examiner—C. L. Albritton
Attorney, Agent, or Firm—Craig and Antonelli

[57] ABSTRACT

A welding method of a turbine diaphragm for joining a spacer having a plurality of nozzle blades to outer and inner wheels. The spacer and the outer or inner wheel are welded from both sides. At first or inlet side of the diaphragm where a motive fluid flows into the diaphragm, the spacer and the outer and inner wheel are welded so that weld depth from the first side will be at most 0.5 L, wherein L is a distance between the first side and the top of the nozzle blade. At the second or outlet side of the diaphragm, from which the motive fluid exits, the spacer and the outer and inner wheels are weld so that a welded depth from the second side will be at least 0.3 C, wherein C is height of the nozzle blades.

5 Claims, 7 Drawing Figures

WELDING METHOD OF TURBINE DIAPHRAGM

BACKGROUND OF THE INVENTION

This invention relates to a method of welding turbine diaphragms, and, more particularly, to a method of joining spacers, provided with a plurality of nozzle blades, to outer and inner wheels by welding.

A turbine rotates a rotor carrying thereon a plurality of turbine blades, with thermal energy of motive fluid such as steam being received by the turbine blades. In order to guide the motive fluid, diaphragms with a plurality of nozzle blades arranged annularly are disposed upstream of the turbine blades and supported by a turbine casing. The diaphragms each comprise outer and inner wheels and spacers with the plurality of nozzle blades. The spacers are joined to the outer and inner wheels by welding.

In order to weld between the spacers and the outer and inner wheels, various welding methods have been proposed. In one proposed method the spacers and the inner and outer wheels are welded by arc-welding, with weld beads being formed on the whole interface between the spacers and the outer and inner wheels except for recess portions formed in the spacers at the central portions of the nozzle blades. Another welding method is described in Japanese Laid-open patent application No. 53-30436 (1978), wherein an electron beam welding method is proposed for welding along the whole intefaces between spacers and the wheels except for central parts of the blades. Thus, the proposed conventional welding method each apply welding along the whole deep interfaces formed in contact relation between the spacers and the outer and inner wheels. As for welding defect occurrence rate, there is a tendency that the welding defect occurrence rate increases as weld depth increases. In the conventional welding methods, weld is applied along the deep interface; therefore, a joined portion by the welding method has a large welding defect occurrence rate, wherein the defects include cracks, blow holes, weld bead deflection from the interface to be welded, etc.

Further, in the arc-welding method, it is necessary for such a deep weld depth to form a large V-shaped groove; therefore, a large amount of weld beads are necessary, which results in increase in labor for welding and an increase in thermal deformation of the diaphragm.

In case where electron beam welding is applied so as to form deep weld, the above-mentioned type of defects are apt to occur. Further, the electron beam welding has difficulty of positioning an electron gun of an electron beam welding machine in alignment with the interface of material to be welded.

SUMMARY OF THE INVENTION

An object of the invention is to provide a turbine diaphragm welding method, in which a turbine diaphragm may be obtained which has substantially strong mechanical strength and a minimum welding defect rate.

Another object of the invention is to provide a turbine diaphragm welding method, in which substantially strong welding joints of a turbine diaphragm can be achieved with reduced labor and minimized welding defects.

Briefly stated, the invention resides in a step of applying welding along interfaces formed between spacers provided with nozzle blades and an outer or inner wheel so that weld depth in the side of the outer or inner wheel at which a motive fluid enters the turbine diaphragm will be at most 0.5 L, wherein L denotes a distance between the nozzle blades and the side of the outer or inner wheel, whereby welding defects which may occur are minimized.

DESCRIPTION OF THE PREFERRED EMBODIMENT

Figure 1:
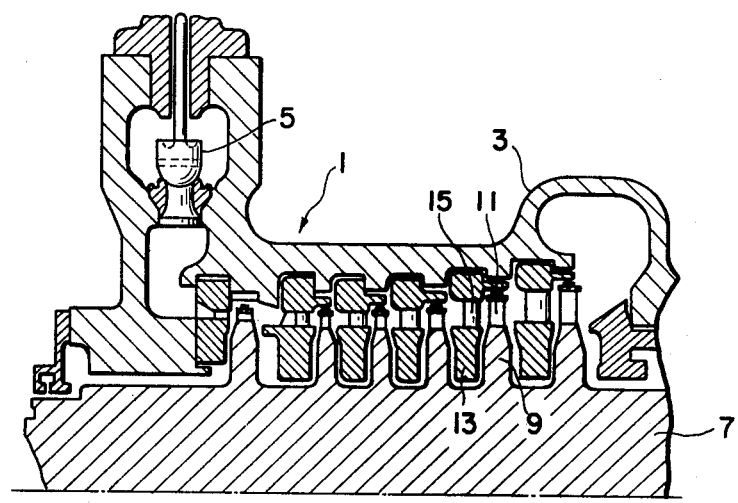
FIG. 1 is a sectional view of an axial flowstream turbine.
Figure 2:
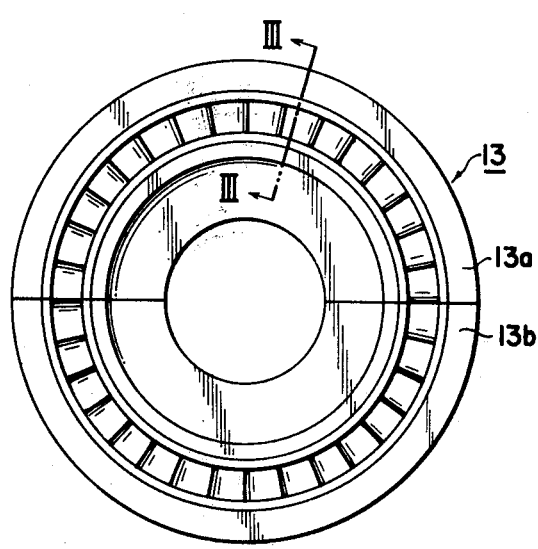
FIG. 2 is a front view of a turbine diaphragm employed in the axial flow steam turbine shown in FIG. 1.
Figure 3:
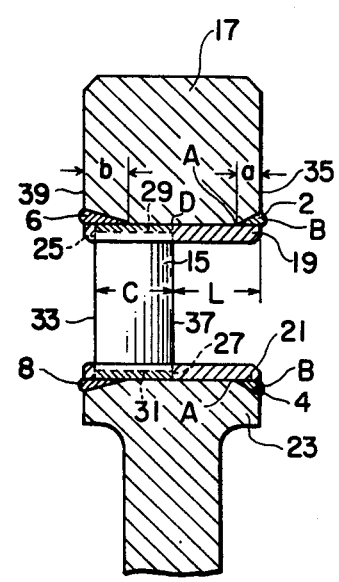
FIG. 3 is a sectional view of the turbine diaphragm taken along a line III—III in FIG. 2.

Referring to FIGS. 1 to 3, a turbine diaphragm constructed by employing an embodiment of a welding method according to the invention will be described hereinafter in detail.

In FIG. 1, a part of an axial flowsteam turbine 1 is illustrated. In the steam turbine generally designated by the reference numeral 1, a motive fluid such as steam is introduced in a casing 3 through a steam valve 5. A turbine rotor 7, provided an a plurality of annularly arranged discs 9 with a plurality of moving blades 11 is disposed in the casing 3. A plurality of turbine diaphragms generally designated by the reference numeral 13 are respectively disposed in opposition to the discs 9. Each of the diaphragms 13 is provided with a plurality of nozzle blades 15. The nozzle blades 15 are annularly arranged and are mounted on the casing 3. The steam, introduced in the casing 3, is guided by the nozzle blades 15 and flows into the moving blades 11 to rotate the rotor 7.

As shown in FIG. 2, the diaphragm 13 is divided into two parts, that is, an upper half diaphragm 13a and a lower half diaphragm 13b. As shown in FIG. 3, upper and lower half diaphragms 13a and 13b each comprise an outer wheel 17, a pair of spacers 19 and 21, an inner wheel 23, and the nozzle blades 15. The plurality of nozzle blades 15 are respectively inserted in holes 25, 27 formed in the pair of spacers 19 and 21. For this purpose, the holes 25, 29 have the same cross-sectional shape as the sectional contour of the ends 29, 31 of the nozzle blades 15. Both the ends 29, 31 of each of the nozzle blades inserted in the holes 25 and 27 are secured to the spacers 19 and 21 by welding. The welded portions of the spacers 19 and 21 and the nozzle blades 15 are finished by machining or grinding to make a nozzle blade assembly 33.

The spacers 19, 21 with the nozzle blades 15, that is, the nozzle blade assembly 33, is fitted between the inner face of the outer wheel 17 and the outer face of the inner wheel 23 to provide an abutment or interface therebetween. The abutment is welded according to an embodiment of a welding method of the invention by electron beam welding (hereinafter simply referred to as EBW) applied along the abutments between the spacers 19, 21 and the outer and inner wheels 17 and 23. On the side 35 of the outer wheel 17 at which a motive fluid such as steam enters the turbine diaphragm 13 or between the nozzle blades 15, that is, on the inlet side 35 of the turbine diaphragm 13, EBW is effected so that weld depth a from the inlet side 35 will be at most 0.5 L that is, a weld depth ratio of a/L≦0.5, wherein a reference L denotes a distance between the inlet side 35 and the top 37 of the nozzle blade 15.

At the side 39 of the outer wheel 17 from which the motive fluid exits, that is, at the outlet side 39 of the outer wheel 17, EBW is effected so that weld depth b from the outlet side 39 will be at least 0.3 C, wherein reference C denotes height of the nozzle blade 15.

Advantageously, when the EBW is effected along the outlet side 39, the spacers 19, 21 and the outer and inner wheels 17, 23 about joint portions between the spaces 19, 21 and the nozzle blades 15 are free from the EBW on the inlet side 35 of the outer and inner wheels 17, 23.

The weld depth a at the inlet side 35 of the outer wheel 17 is determined from the viewpoint of maximum welding defect occurrence rate and the value of stresses induced in the welding portion 2.

Figure 4:
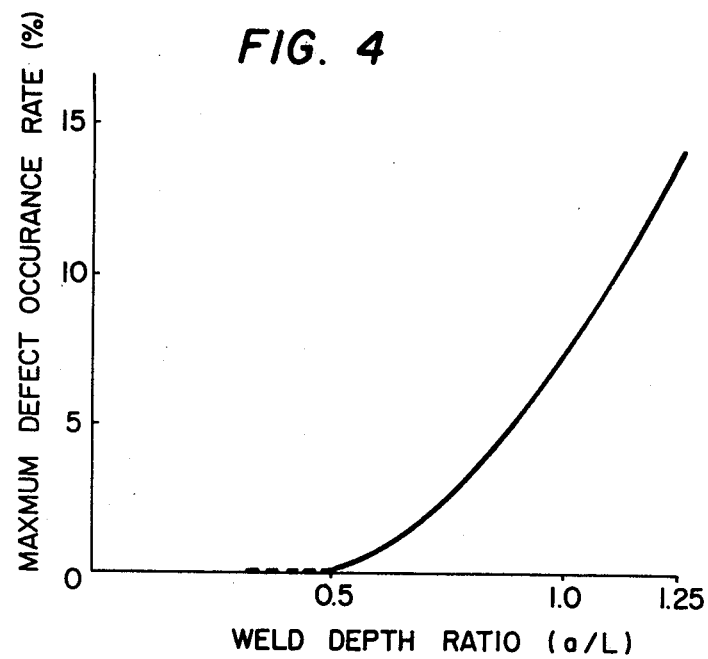
FIG. 4 is a graph showing a relationship between the maximum defect occurrence rate at a welding portion of a turbine diaphragm and weld depth ratios.

In FIG. 4, shows a relationship between the maximum welding defect occurrence rate and the weld depth ratio a/L. From FIG. 4, it is noted that it is necessary for the weld depth ratio a/L to be equal to or less than 0.5 in order to minimize the maximum welding defect occurrence rate, that is, to make it approximately zero.

Figure 5:
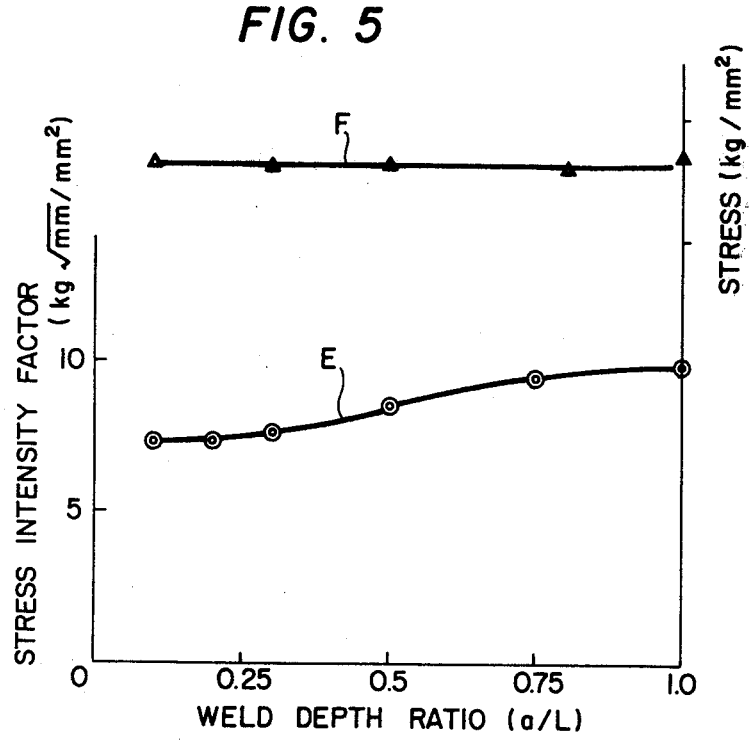
FIG. 5 is a graph showing a relationship between stress intensity factor and weld depth ratio and a relation between the stress and the weld depth ratio, respectively.
Figure 6:
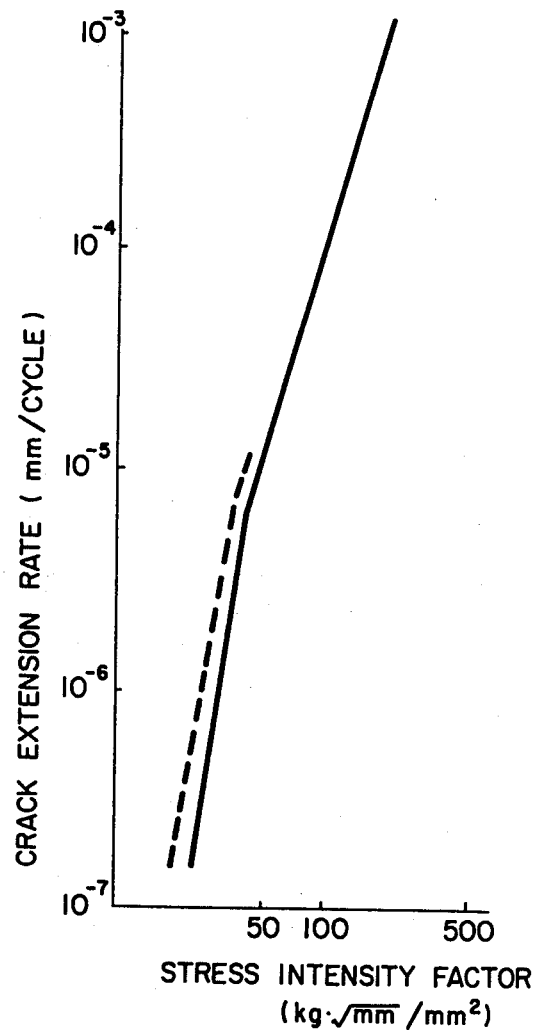
FIG. 6 is a graph showing relationship between crack extension rate and the stress intensity factor.

On the other hand, welding strength of the turbine diaphragm 13 which is welded in various weld depth ratios ranging from 0.1 to 1.0 and subjected to the same load as under the normal operation of the turbine is analyzed by a finite element method. The results are shown in FIG. 5, in wich a curve E expresses change in stress intensity factor at a weld end A in the inlet side 35 of the outer wheel 17. From the curve E, it is noted that the stress intensity factor is within 10 kg/mm$^{3/2}$. When the stress intensity factor is less than 20 kg/mm$^{3/2}$, it is known that cracks do not further extend, which is apparent from FIG. 6 in which two curves H and J are shown, wherein one curve H shows a relationship between the stress intensity factor and crack extension rate mm/cycle of a structural material of the turbine disposed in the atmosphere at a room temperture. The other curve J shows a relationship between the stress intensity factor and the crack extension rate of the turbine structual material disposed in the atmosphere at a temperature of 500° C. According to the curve H or J, the crack extension rate is less than $10^{-8}$ mm/cycle when the stress intensity factor is less than 10 kg/mm$^{3/2}$, which means that the crack that initially appeared extends by 1 mm after being subjected to a repeated load of $10^8$ times. There is no turbine subjected to such a repeated load. The repeated load is, for example a load applied on the diaphragm 13 when the turbine starts. This load is repeated by $10^4$ times in 40 years if daily stops are effected for 40 years. Therefore, when the stress intensity factor is less than 10 kg/mm$^{3/2}$, the cracks even if appearing in the welding portions 2, are not extended further.

However, in case of the weld depth ratio of 1.0 a/L≦, stresses induced in the welding portion 2 of the turbine diaphragm 13 interfere with stresses induced in the fitting portion D of the spacers 19, and the turbine diaphragm 13 has the maximum stress intensity factor at the fitting portion D. Therefore, the weld depth ratio of 0.5 is better to avoid placing the weld end A on the fitting portion D as shown in FIG. 3.

The curve F in FIG. 4 expresses stresses induced at the portion B in the inlet side 35 of the outer wheel 17. The stresses are less than 1.5 kg/mm$^2$ regardless of a change in the weld depth a, that is, they are very small in value. Therefore, even if the turbine diaphragm 13 is joined by the weld depth a less than 0.5 L, there is no problem regarding the strength. The weld depth a which is very small is enough as long as the gas, steam, etc. is prevented from penetrating between the outer wheel 17 and the spacer 19 through the weld.

Figure 7:
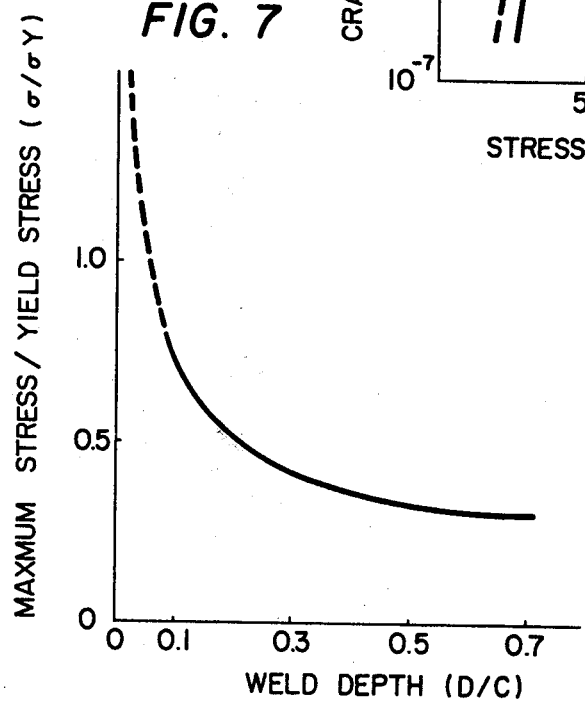
FIG. 7 is a graph showing a relation between a ratio of the maximum stress to yield stress and the weld depth.

The preferable weld depth b of a welding portion 6 at the outlet side 39 of the outer wheel 17 is determined by welding strength. Therefore, stresses induced in the welding portion 6, when a weld depth ratio b/C is changed in the range of from 0.1 to 0.7, are analyzed by the finite element method, wherein reference C denotes the height of the nozzle blade 15. The results are shown in FIG. 7, wherein a relationship between the weld depth ratio b/C and a ratio of the maximum stress induced in a sectional area of the welding portion 6 to the yield stress. From FIG. 7, it is noted that in case of the weld depth b less than 0.3 C, the stresses induced in the welding portion 6 are greatly influenced by the weld depth b, and the strength of the welding portion is not greatly improved even if the weld depth b increases beyond the 0.3 C. Where the ratio of the maximum stress $\sigma$ to the yield stress $\sigma_y$ is less than 0.5, the weld portion 6 is substantial in strength. Therefore, it is preferable that the weld depth b in the outlet side 39 of the outer wheel 17 is at least 0.3 C, and the weld depth of 0.3 C is most suitable, considering the welding defect occurrence rate and an amount of labor employed for welding.

The spacer 21 and the inner wheel 23 are welded from the inlet and outlet sides 35 and 39 in a similar manner so that welding portions 4 and 8 are formed. The weld depth ratio a/L and b/c also are adapted for the welds 4 and 8.

According to the embodiment, the suitable welding depth can be employed, in particular by EBW so that the welding defects are reduced. Further, the reduced weld depth brings decrease in labor for welding and decrease in thermal deformation of the diaphragm 13.

What is claimed is:

1. A welding method of a turbine diaphragm comprising outer and inner wheels, a pair of spacers, and a plurality of nozzle blades secured between the spacers, the method comprising the steps of:
arranging the pair of spacers with the pluralty of nozzle blades between the outer wheel and the inner wheel so that the pair of spacers are fitted between the outer and inner wheels to provide abutments between the outer and inner wheels and the pair of spacers;
welding along the abutments between the outer and inner wheels and the pair of spacers at an inlet side of the turbine diphragm at which a motive fluid enters the turbine diaphragm, so that a weld depth from the inlet side of the turbine diaphragm will be at most 0.5 L, wherein L is a distance between the inlet side of the turbine diaphragm and a tip of the nozzle blades; and welding along the abutments between the outer and inner wheels and the pair of spacers at an outlet side of the turbine diaphragm at which the motive fluid exits the turbine diaphragm so that a weld depth at the outlet side will be at least 0.3 C, wherein C is a height of the nozzle blades.

2. The welding method as defined in claim 1, wherein the steps of welding are effected by electron beam welding.

3. The welding method as defined in one of claims 1 or 2, wherein, in said step of welding along the abutment between the outer and inner wheels and the spacers from the outlet side of the turbine diaphragm, the welding is effected so that the weld depth will reach about 0.3 C.

4. A method of welding a turbine diaphragm, the method comprising the steps of:

preparing spacers with a plurality of annularly arranged nozzle blades, fitting respective ends of each of the plurality of nozzle blades into corresponding holes provided in the spacers, and arc-welding the respective blades and spacers to join each of the blades to the spacers;

finishing the welded portions of the spacers to form annular joining faces;

preparing inner and outer wheels so that the inner wheel has an annular outer face to be welded and the outer wheel has an annular inner face to be welded;

positioning the spacers and the outer and inner wheels in contact with each other so as to provide interfaces between the spacers and the inner and outer wheels;

electron beam welding along the interfaces between the spacers and the outer and inner wheels from a first side of the outer and inner wheels at an inlet side of a motive gas to the nozzle blades so that a weld depth of at most of half of a distance between the first side and the nozzle blades; and electron beam welding along the interfaces between the spacers and the outer and inner wheels from a second side opposite to the first side of the outer and inner wheels so that a weld depth is at least one third a height of the nozzle blades.

5. The method as defined in claim 4, wherein in the step of electron beam welding along the interfaces from the second side, the spacers and the outer and inner wheels about joint portions between the spacers and the nozzle blades are free from the electron beam welding at the first side of the outer and inner wheels.

* * * * *